(12) United States Patent
Dua

(10) Patent No.: US 7,119,293 B1
(45) Date of Patent: Oct. 10, 2006

(54) WRAP AROUND TERMINAL FOR TURN SIGNAL SWITCH ASSEMBLY

(75) Inventor: Karan Dua, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 11/174,918

(22) Filed: Jul. 5, 2005

(51) Int. Cl.
*H01H 9/00* (2006.01)

(52) U.S. Cl. .................. 200/61.54; 200/61.27; 439/15; 439/34

(58) Field of Classification Search ............. 200/61.54, 200/61.27; 439/15–17, 31–34
See application file for complete search history.

(56) References Cited

U.S. PATENT DOCUMENTS

| 5,852,867 A | * | 12/1998 | Durocher | .................. | 29/622 |
| 6,172,311 B1 | * | 1/2001 | Hayashi | .................. | 200/61.27 |
| 6,548,777 B1 | * | 4/2003 | Kato | .................. | 200/335 |
| 6,624,364 B1 | * | 9/2003 | Liburdi | .................. | 200/61.27 |
| 6,677,543 B1 | * | 1/2004 | Takahashi et al. | ......... | 200/61.3 |

* cited by examiner

*Primary Examiner*—K. Lee
(74) *Attorney, Agent, or Firm*—Woodard, Emhardt, Moriarty, McNett & Henry LLP

(57) ABSTRACT

Apparatus, methods and devices for electrically coupling wires in a turn signal switch assembly that prevents the entangling of wires with the different components of the turn signal switch assembly.

10 Claims, 7 Drawing Sheets

WRAP AROUND TERMINAL FOR TURN SIGNAL SWITCH ASSEMBLY

TECHNICAL FIELD

Apparatus, methods and devices for electrically coupling two points on an electrical device and simultaneously preventing the entangling of wires with other devices, particularly, but not exclusively, with respect to a turn signal switch for use in automotive applications.

BACKGROUND

In almost every motor vehicle the turn signal switch is used to allow the operator to indicate that they are turning. Usually, the turn signal switch is a generally cylindrical extension extending out from the steering column. To indicate that one is going to make a turn, the turn signal switch is commonly pressed upward or downward to indicate a right or left turn, respectively. In addition, other features are often added. For instance, high beam lights can be activated by either pressing forward or pulling back on the turn signal switch for many motor vehicles also cruise control, wiper control, hazard warning, etc. may be included, but is not limited to this list. To effectuate all these different electrical events from mechanical inputs, cams within the switch are sometimes used to translate movement of the switch to closing of an electrical circuit. A potential problem exists as wires within the switch could become entangled with the cams that respond to the mechanical movement of the turn signal switch. In an extreme case, the wires could cause the turn signal switch to fail.

SUMMARY

The following is not intended to alter the scope of the claims in any way. Any use of this section to alter the scope of the invention as defined in the claims is improper and is not the intention of the drafter. One is directed to the claims at the end of this document; those claims summarize the various claimed inventions.

An apparatus comprising a turn signal switch assembly comprising one or more electronic components including at least one wire; a housing for containing the one or more electronic components, the housing including a shoulder bolt housing having an outer circumference; and a connector having a front portion, a middle portion, and a terminal portion, wherein the front portion is constructed and arranged for conductively coupling to the at least one wire, wherein the middle portion is constructed and arranged to substantially wrap around the outer circumference of the shoulder bolt housing, wherein the terminal portion is constructed and arranged to extend outside of the housing.

A method for ensuring proper operation of cam assemblies internal to a turn signal switch assembly comprising providing a turn signal switch assembly including a housing having a shoulder bolt housing and at least one wire; providing a connector having a front, middle, and terminal portion; inserting the connector into the turn signal switch assembly, wherein the middle portion of the connector wraps around the shoulder bolt housing; coupling the front portion of the connector to the at least one wire.

A device for safely electrically coupling around a portion of the circumference of a shoulder bolt housing in a turn signal switch assembly comprising: a conductive connector comprising: a front portion lying substantially in a first plane, wherein the front portion includes wire crimps; a middle portion integrally formed with the front portion, the middle portion defining a curved arc constructed and arranged to match the contour of the shoulder bolt housing; a terminal portion integrally formed with the middle portion comprising: a first part generally lying in a plane substantially parallel to the plane occupied by the front portion; a second part generally lying in a plane substantially perpendicular to the plane occupied by the first part.

DETAILED DESCRIPTION

For the purposes of promoting an understanding of the principles of my apparatus, methods, and devices reference will now be made to selected embodiments and specific language will be used to describe the same. It will nevertheless be understood that no limitation of the scope of the claims of the invention is thereby intended. Any alterations, modifications, and further applications of the principles of my apparatus, methods and devices as illustrated being contemplated as would normally occur to one skilled in this art.

A turn signal switch assembly used to indicate turn signals on a motor vehicle include a connector to connect a wire to a terminal. The connector removes wires from the vicinity of cams to prevent entanglement of the wires. In order to better illustrate my apparatus, methods and devices, specific reference will now be made to exemplary illustrated embodiments.

Figure 1:
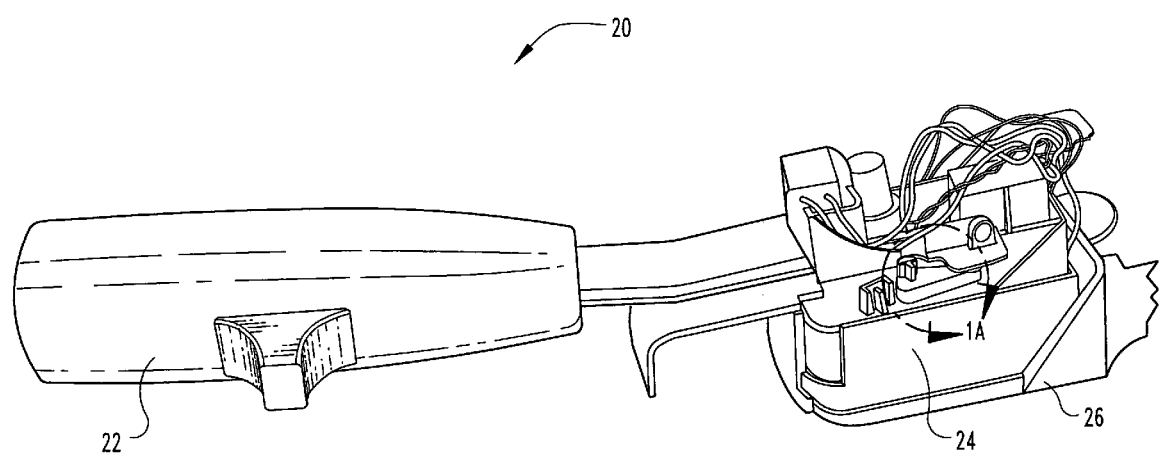
FIG. 1 is a perspective view of a prior art turn signal switch assembly according to an example embodiment.

FIG. 1 illustrates a turn signal switch assembly 20 according to an example embodiment. The turn signal switch assembly 20 includes two main parts. First is the switch handle 22 that allows the user to grasp and move the switch and a junction box 24 that connects to the steering column of the vehicle (not shown). The switch handle 22 is generally formed of a plastic or other material readily apparent to those skilled in the art. The switch handle 22 can move in a variety of directions. In some embodiments, the switch handle 22 moving upward (with respect to the ground) causes a right turn indication and the switch handle 22 moving downward causes a left turn indication. It is contemplated by those skilled in the art, however, that any type of movement of the switch handle 22 can be used in alternate embodiments. The junction box 24 has a housing 26 and one or more electronic components that are contained inside. The junction box 24 is operatively coupled to a steering column (not shown) so that the mechanical inputs provided by moving the switch handle 22 can control the lighting of various lights on the motor vehicle.

Figure 1A:
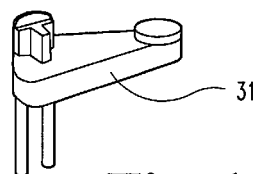
FIG. 1A is an enlarged view of a cam assembly to be used with the turn signal switch assembly illustrated in FIG. 1.

FIG. 1 includes a section that is encircled and marked 1A. FIG. 1A is an enlarged illustration of section 1A of FIG. 1. A cam assembly 31 is illustrated without the housing 26 cloaking a large portion of the device. The cam assembly 31 is the mechanical construction that translates the physical motion of the switch handle 22 into the mechanical movement that controls the various functions in the automobile. A more detailed description of the operation of the cam assembly 31 in the turn signal switch assembly 20 is provided in FIG. 4 hereinbelow.

Figure 2:
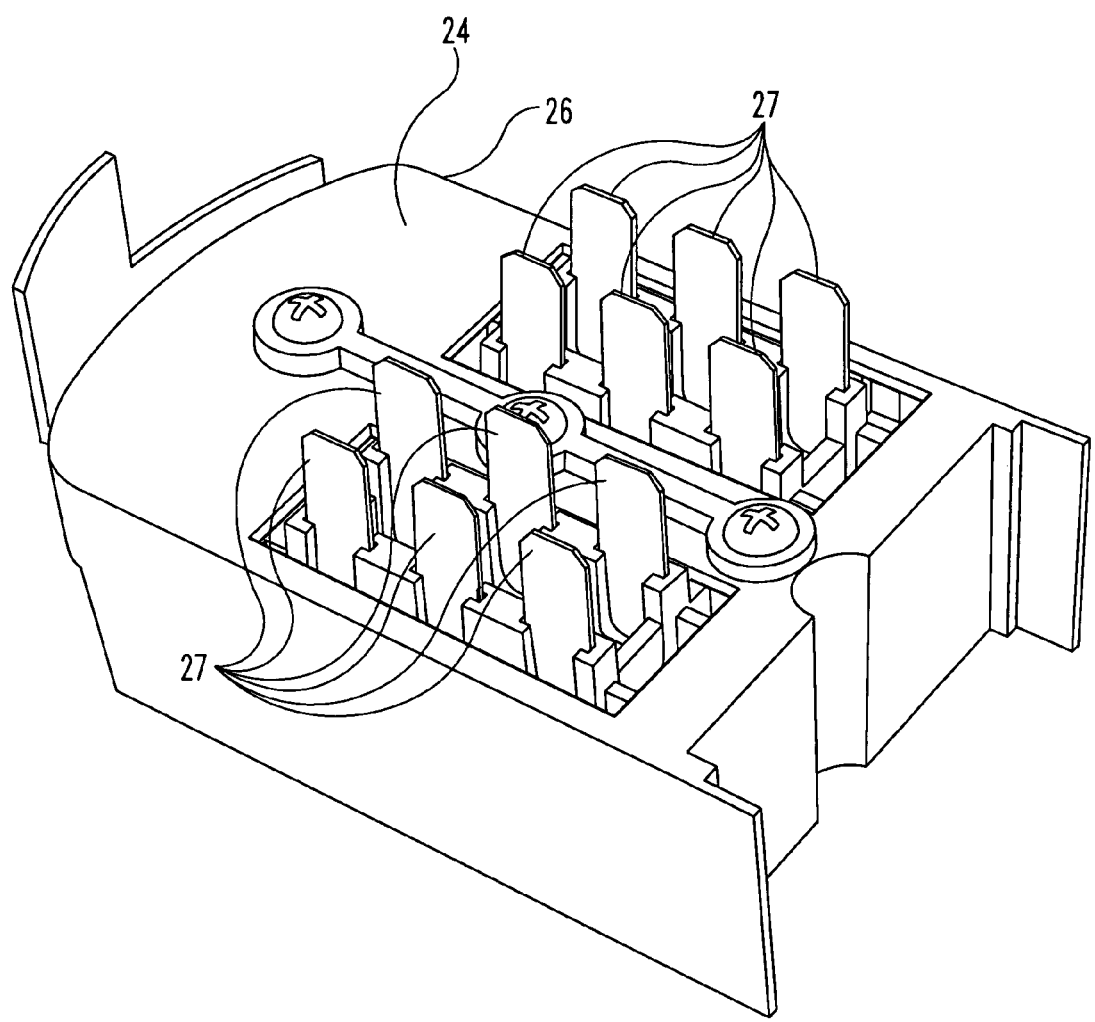
FIG. 2 is a rear perspective view of the junction box of the prior art turn signal assembly illustrated in FIG. 1.

FIG. 2 illustrates one embodiment of the junction box 24 having a plurality of terminals 27 from a rear perspective view. These terminals 27 are operatively coupled with corresponding points in the steering column to transmit electrical signals that correspond to different electrical channels that perform a variety of functions on the vehicle. The terminals 27 are generally conductive areas having sufficient rigidity to withstand the application of stress.

Figure 3:
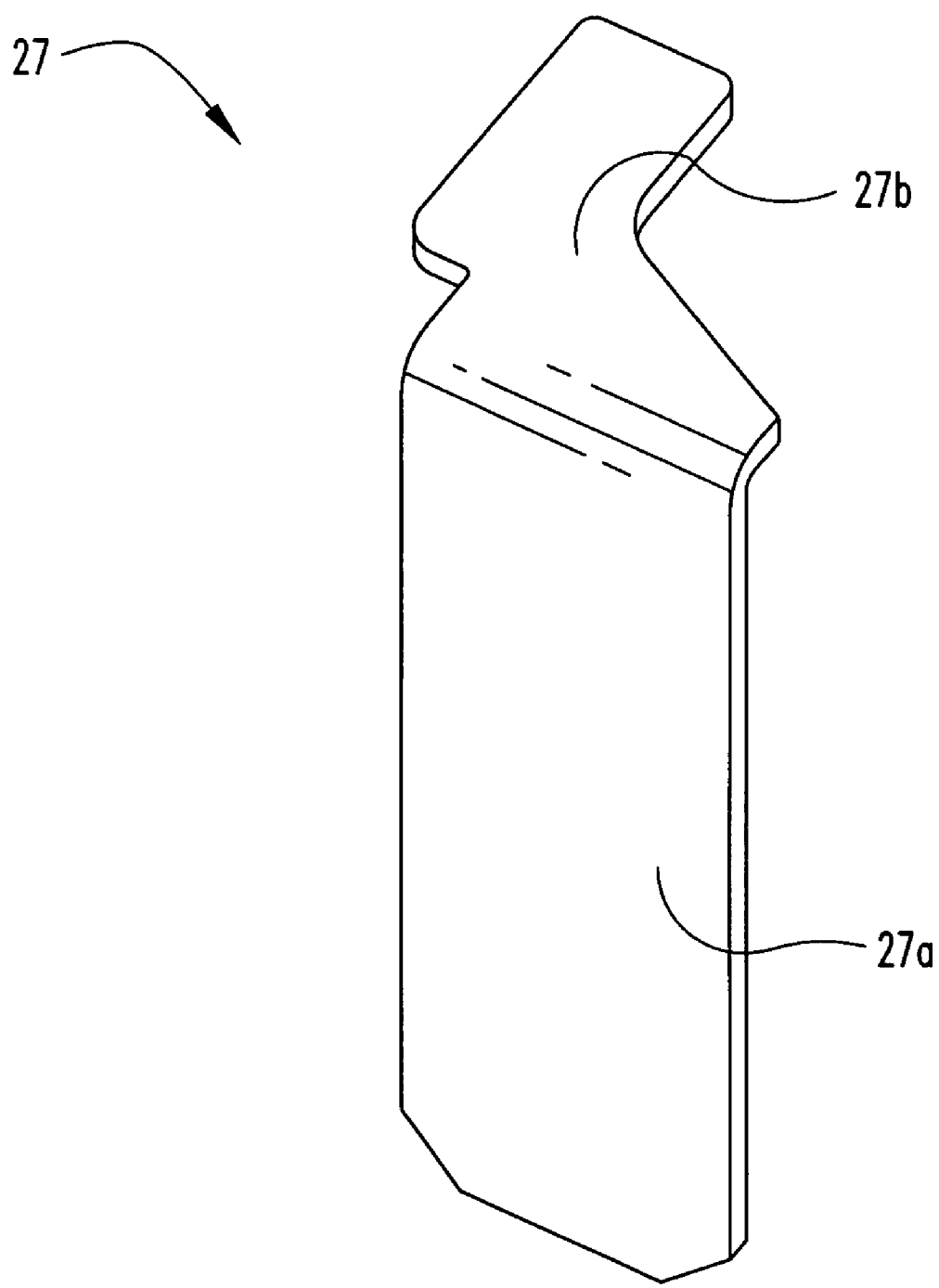
FIG. 3 is a perspective view of a prior art terminal illustrated in FIG. 2

FIG. 3 illustrates a perspective view of a prior art terminal 27. The terminal 27 includes a first component 27a and a second component 27b. The first component 27a is the portion of the terminal 27 that extends through the bottom of the junction box 24 as illustrated in FIG. 2. The second component 27b is the portion of the terminal 27 that lies inside of the junction box 24. Therefore, electrical coupling can be made from components inside of the junction box 24 to outside of the junction box 24.

Figure 4:
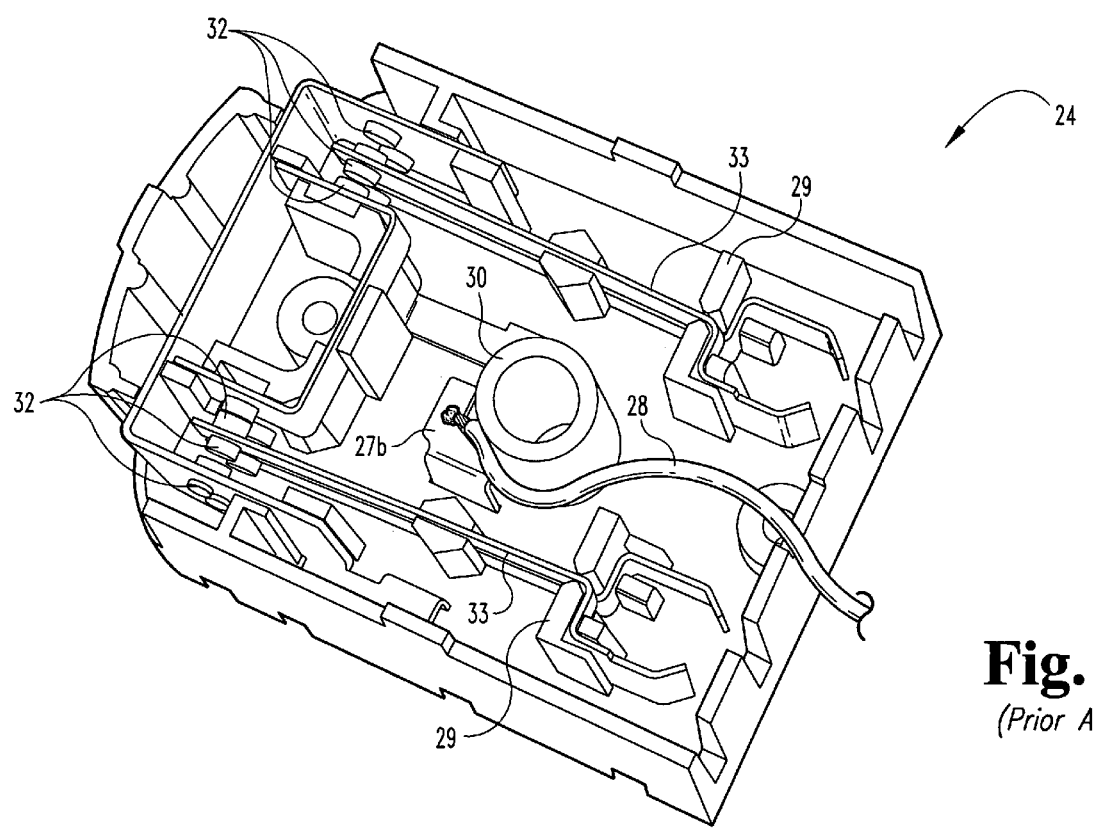
FIG. 4 is a view of a cross section of the junction box of a prior art turn signal assembly of FIG. 1.

FIG. 4 illustrates the cross section of one embodiment of the junction box 24. The various electronic components that are present inside the junction box 24 are illustrated. FIG. 4 illustrates a junction box 24 where a wire 28 is directly connected to second component 27b of a terminal 27. The portion of wire 28 not coupled to component 27b can be loose or attached to junction box 24 by adhesive or other methods readily apparent to those skilled in the art. Junction box 24 includes the blocks 29 that have a shoulder bolt housing 30 generally therebetween. The shoulder bolt housing 30 is one-half of the passage through which the bolt that mounts the junction box 24 to the steering column (not shown) passes. As indicated previously, this design can be prone to failure because the wire 28 may get caught up in the cam assemblies 31 (not shown), become tangled and fail. Also, the leaf terminals 33 that move in relation to the cam assemblies 31 (not shown) can also become tangled with any one of the wires 28. During operation, the two longer poles of the cam assemblies 31 (not shown) move causing the leaf terminals 33 to move laterally in different directions so that the contacts 32 on the leaf terminals 33 can contact the contacts 32 on either side of the leaf terminals 33 to complete differing circuits illuminating different vehicle lights. In the illustrated embodiment, there are four leaf terminals 33 with two on each side, one on top of the other. Other embodiments contemplate different numbers of leaf terminals 33. Accordingly, even if wire 28 is affixed to the junction box 24 using adhesive or the like, the amount of vibration from operation of the motor vehicle and the turn signal assembly 20 itself, could cause the wire 28 to eventually come loose. Therefore, even fixing a wire 28 to the junction box 24 is not a good solution because the wires 28 could still come loose, become entangled, and fail.

Figure 5:
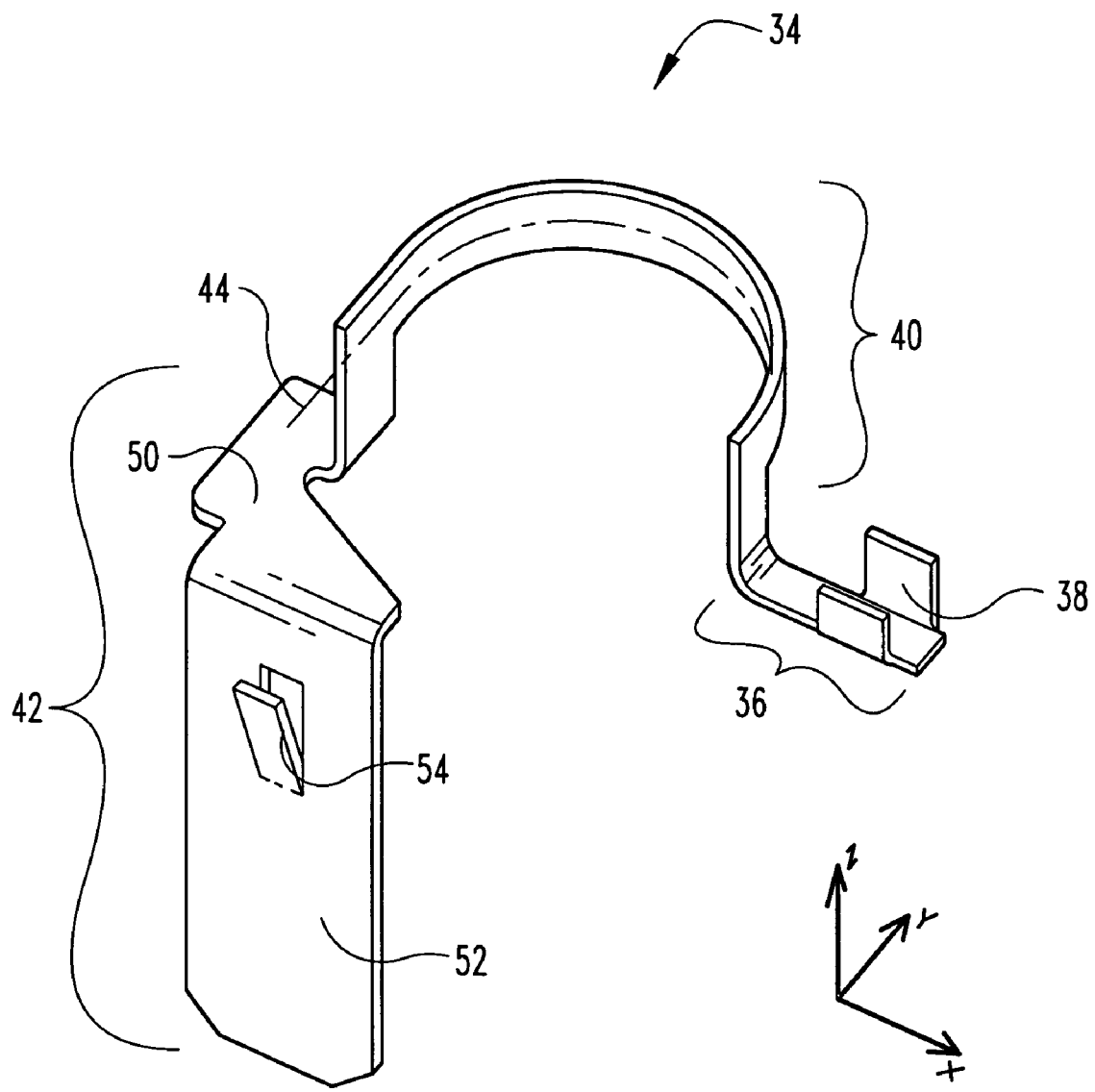
FIG. 5 illustrates an enlarged perspective view of a connector according to one embodiment.

FIG. 5 illustrates a perspective view of one embodiment of a connector 34 that protects the wire 28 from the risk of entanglement. The illustrated connector 34 is composed of metal, however, those skilled in the art will recognize that any sturdy conductive material can be used in alternate embodiments. The connector 34 is divided into three major portions: a front portion 36, a middle portion 40, and a terminal portion 42. The first portion is the front portion 36 that includes wire crimps 38. The wire crimps 38 are designed so that one end of a wire (not shown) can be inserted between the crimps 38 and then the crimps 38 can be mechanically pressed around the end of that wire to provide an electrical coupling between the connector 34 and the wire. This operation will also securely mechanically couple the wire to the connector 34. In addition, the front portion 36 lies in a single plane for the length of the entire portion.

Connector 34 also includes a middle portion 40, that is configured to wrap closely around the shoulder bolt housing 30. This shape of middle portion 40 serves to reduce the effects of vibration upon the middle portion 40, since it is supported by the shoulder bolt housing 30, thereby preventing failure. It is contemplated in other embodiments, the shape of the middle portion 40 varies as long as it wraps closely around a vertical support and it prevents entanglement with other components of the junction box 24. The connector 34 also includes a third portion, the terminal portion 42 that is similar to the prior art terminal 27 illustrated in FIG. 3. The connector 34 moves the wire 28 connection point (the crimps 38) sufficiently far away from the cam assemblies 31 to avoid risk of entanglement therein.

To facilitate description of the structure, Cartesian coordinates labeled X, Y, and Z are illustrated in FIG. 5. The middle portion 40 extends in a curved arc to closely match the contour of the shoulder bolt housing 30 such that, when mounted into the junction box 24, the middle portion 40 touches the shoulder bolt housing 30 along most or all of its length and is therefore supported thereby. Vibration of the junction box 24 will therefore tend to not result in substantial movement of the connector 34. A curved longitudinal axis 44 of middle portion 40 lies in a plane that is substantially parallel to the plane of front portion 36. Each segment of middle portion 40 that is perpendicular to the longitudinal axis 44 of middle portion 40 extends in the Z direction. It will be appreciated that middle portion 40 may extend in an arc of any number of degrees, depending upon where in the junction box 24 it is desired to place the wire crimps 38 and the terminal 42.

The terminal portion 42 includes two main parts 50 and 52. These main parts 50, 52 are similar to the first component 27a and the second component 27b, respectively, of the terminal 27 illustrated in FIG. 3. The first part 50 lies generally in the X-Y plane. The terminal portion 42 also includes a second part 52 generally lying in the X-Z plane. The second part 52 includes a catch 54 to prevent the connector 34 from moving once it has been inserted into the opening through the junction box 24.

Figure 6:
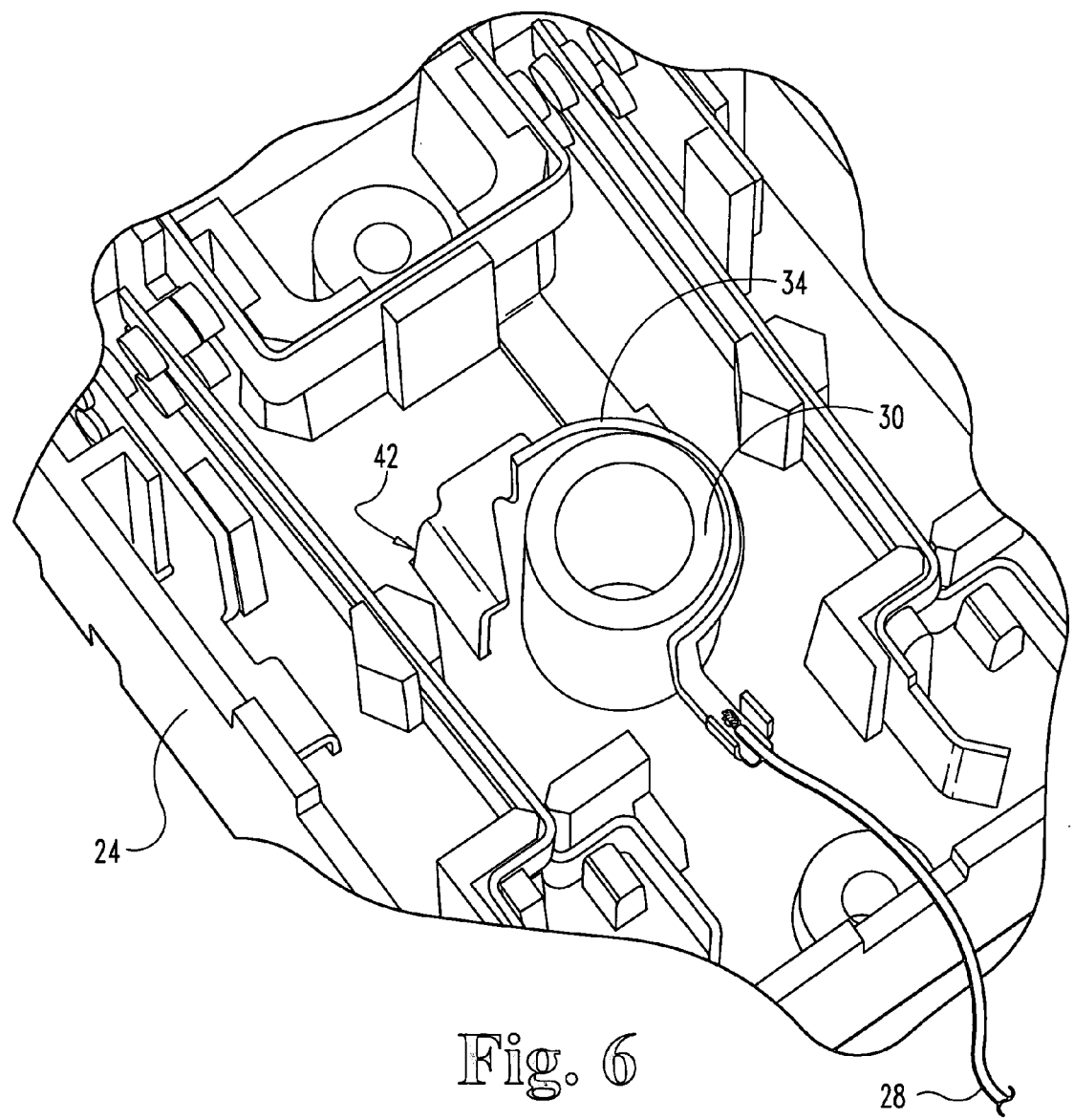
FIG. 6 illustrates the connector of FIG. 5 inserted into the junction box illustrated in FIG. 4.

FIG. 6 illustrates a cross section of the junction box 24 using the connector 34 of FIG. 5. In this embodiment, the wire 28 is electrically connected to the connector 34 to enable electrical connection between the wire 28 and the terminal portion 42 of the connector 34 that is connected to the steering column (not shown) of the motor vehicle. The wire 28 is connected to one end of the connector 34 and then the connector goes closely around the circumference of the shoulder bolt housing 30 before terminating outside the junction box 24 with the terminal portion 42. This design keeps the wire 28 away from the cam assemblies 31 to prevent failure. Furthermore, the connector 34 is supported against the shoulder bolt housing 30 in order to minimize vibration and consequent movement of the connector 34 during operation of the motor vehicle.

Figure 7:
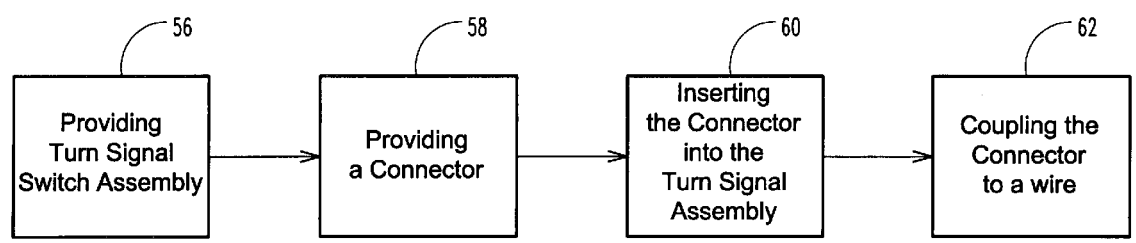
FIG. 7 illustrates a method of operation of the connector with the turn signal switch assembly illustrated in FIG. 1.

In operation, the embodiments work as follows as illustrated in FIG. 7. First, in the step 56 the turn signal switch assembly 22 is provided. Next, in the step 58 the connector 34 is provided. In the step 60, the connector 34 is inserted into the turn signal switch assembly 22 by placing the terminal portion 24 through the housing 26 of the junction box 24. In addition, in some embodiments, the catch 52 ensures that the mechanical connection is permanent. In addition, the connection is made in such a manner so that the middle portion 38 of the connector 34 wraps around the shoulder bolt housing 30. Next, in the step 62, the connector 34 is electro-mechanically coupled to the wire 28 by inserting the wire 28 into the wire crimps 38 and pressing the wire crimps 38 around the wire 28. The turn signal assembly 22 is then assembled to be inserted into the steering column of the automobile (not shown). Because of the design of connector 34, the wires inside of the junction box 24 are firmly fixed to prevent entanglement and possible subsequent failure thereof. Those skilled in the art readily recognize that the steps 56, 58, 60, and 62 can performed in different orders besides those already discussed.

While selected embodiments have been illustrated and described in detail in the drawings and foregoing description, the same is to be considered as illustrative and not restrictive in character, it being understood that only a few embodiments have been shown and described. All contemplated embodiments are desired to be protected.

I claim:

1. An apparatus comprising:
    a turn signal switch assembly comprising:
        one or more electronic components, said electronic components including at least one wire
        a housing for containing said one or more electronic components, said housing including a shoulder bolt housing having an outer circumference; and
        a connector having a front portion, a middle portion, and a terminal portion, wherein said front portion is constructed and arranged for conductively coupling to said at least one wire, wherein said middle portion is constructed and arranged to substantially wrap around said outer circumference of said shoulder bolt housing, wherein said terminal portion is constructed and arranged to extend outside of said housing.

2. An apparatus according to claim 1, wherein said front portion further comprises wire crimps adapted to couple to the at least one wire.

3. An apparatus according to claim 1, wherein said terminal portion includes a catch.

4. An apparatus according to claim 1, wherein said middle portion defines a curved shape.

5. A method for ensuring proper operation of cam assemblies internal to a turn signal switch assembly comprising:
    providing a turn signal switch assembly including a housing having a shoulder bolt housing and at least one wire;
    providing a connector having a front, middle, and terminal portion;
    inserting said connector into said turn signal switch assembly, wherein said middle portion of said connector wraps around said shoulder bolt housing; and
    coupling said front portion of said connector to said at least one wire.

6. A method according to claim 5, wherein said front portion couples to the at least one wire using wire crimps.

7. A method according to claim 5, wherein said terminal portion includes a catch.

8. A method according to claim 5, wherein said middle portion defines a curved shape.

9. A device for safely electrically coupling around a portion of the circumference of a shoulder bolt housing in a turn signal switch assembly comprising:
    a conductive connector comprising:
    a front portion lying substantially in a first plane, wherein said front portion includes wire crimps;
    a middle portion integrally formed with said front portion, said middle portion defining a curved arc constructed and arranged to match the contour of said shoulder bolt housing;
    a terminal portion integrally formed with said middle portion comprising:
        a first part generally lying in a plane substantially parallel to the plane occupied by said front portion;
        a second part generally lying in a plane substantially perpendicular to the plane occupied by said first part.

10. The device of claim 9, wherein the middle portion defines a curved longitudinal axis that lies in a second plane substantially parallel to the first plane.

* * * * *